(12) United States Patent
Ivakitch

(10) Patent No.: US 12,253,031 B1
(45) Date of Patent: Mar. 18, 2025

(54) GAS TURBINE BLEED OFF VALVE

(71) Applicant: Pratt & Whitney Canada Corp., Longueuil (CA)

(72) Inventor: Richard Ivakitch, Scarborough (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/598,074

(22) Filed: Mar. 7, 2024

(51) Int. Cl.
| | | |
|---|---|---|
| *F02C 9/18* | (2006.01) | |
| *F01D 17/10* | (2006.01) | |
| *F01D 17/12* | (2006.01) | |

(52) U.S. Cl.
CPC ............. *F02C 9/18* (2013.01); *F01D 17/105* (2013.01); *F01D 17/12* (2013.01); *F05D 2220/323* (2013.01); *F05D 2260/60* (2013.01)

(58) Field of Classification Search
CPC .......... F16K 3/24; F16K 27/041; F16K 11/16; F16K 11/07; F01D 17/105; F01D 17/12; F05D 2220/323; F05D 2260/60; F02C 9/18
See application file for complete search history.

(56) References Cited

U.S. PATENT DOCUMENTS

| | | |
|---|---|---|
| 9,657,647 B2 | 5/2017 | Mackin et al. |
| 10,487,751 B2 | 11/2019 | Dibenedetto |
| 2016/0097289 A1* | 4/2016 | Benson ................. F01D 5/3007 416/220 R |
| 2019/0195082 A1* | 6/2019 | Bifulco ............... F04D 27/0215 |
| 2023/0228219 A1 | 7/2023 | Zheng et al. |

* cited by examiner

*Primary Examiner* — Todd E Manahan
*Assistant Examiner* — Rodolphe Andre Chabreyrie
(74) *Attorney, Agent, or Firm* — CANTOR COLBURN LLP

(57) ABSTRACT

A bleed arrangement of a gas turbine engine of an aircraft includes a core casing having one or more bleed openings define therein. The core case separates a core flowpath from a bypass flowpath of the gas turbine engine. A slider is positioned radially inboard of a case inner surface of the core casing relative to an engine central longitudinal axis. The slider is configured to be moved circumferentially between a closed position blocking the one or more bleed openings and an open position in which at least a portion of a core airflow is diverted from the core flowpath into the bypass flowpath as bleed airflow.

20 Claims, 8 Drawing Sheets

GAS TURBINE BLEED OFF VALVE

BACKGROUND

Exemplary embodiments of the present disclosure pertain to the art of gas turbine engines.

Gas turbine engines are configured to operate across a wide range of operating conditions, such as speeds, loads, pressures, etc., also referred to as an "operating envelope". The efficiency of operation of the gas turbine engine varies across the operating envelope, due at least in part to condition mismatch between stages of the multi-stage compressor of the gas turbine engine. To improve efficiency of the compressor and thus the gas turbine engine in such mismatch conditions, many gas turbine engines include bleed off valves that operate at certain operating conditions of the gas turbine engine to remove airflow from the compressor flowpath. This improves the matching between stages of the compressor and thus improves operating efficiency at these conditions.

Many such bleed off valves, however, are complex mechanisms with many components, and are bulky in nature. The art would well receive an improved bleed off valve.

BRIEF DESCRIPTION

In one exemplary embodiment, a bleed arrangement of a gas turbine engine of an aircraft includes a core casing having one or more bleed openings define therein. The core case separates a core flowpath from a bypass flowpath of the gas turbine engine. A slider is positioned radially inboard of a case inner surface of the core casing relative to an engine central longitudinal axis. The slider is configured to be moved circumferentially between a closed position blocking the one or more bleed openings and an open position in which at least a portion of a core airflow is diverted from the core flowpath into the bypass flowpath as bleed airflow.

Additionally or alternatively, in this or other embodiments the core casing includes a track positioned at the case inner surface, and the slider is received in and is configured to travel along the track.

Additionally or alternatively, in this or other embodiments the track is formed integral to the core casing.

Additionally or alternatively, in this or other embodiments the track is secured to the core casing via one or more fasteners.

Additionally or alternatively, in this or other embodiments a friction-reducing coating is applied to one or more of the track and the slider.

Additionally or alternatively, in this or other embodiments the slider is configured to seal against the case inner surface when the slide is in the closed position.

Additionally or alternatively, in this or other embodiments the core case includes two or more bleed openings, and the slider circumferentially spans the two or more bleed openings to control a flow of core airflow therethrough.

Additionally or alternatively, in this or other embodiments the slider includes a plurality of slider openings. Each slider opening of the plurality of slider openings aligns with a corresponding bleed opening of the plurality of bleed openings when the slider is in the open position.

Additionally or alternatively, in this or other embodiments a circumferential included angle of the slider between a first circumferential end and a second circumferential end of the slider is 270 degrees or more.

Additionally or alternatively, in this or other embodiments an actuator is operably connected to the slider to drive movement of the slider along the track.

In another exemplary embodiment, a gas turbine engine of an aircraft includes a compressor section to compress a core airflow, a combustor section configured to combust a mixture of fuel and compressed core airflow, and a turbine section driven by products of the combustion. The turbine section is operably connected to the compressor to drive operation of the compressor. A core casing separates a core flowpath from a bypass flowpath and encloses the compressor section, the combustor section and the turbine section. A bleed arrangement includes one or more bleed openings in the core casing at the compressor section, and a slider is positioned radially inboard of a case inner surface of the core casing relative to an engine central longitudinal axis. The slider is configured to be moved circumferentially between a closed position blocking the one or more bleed openings and an open position in which at least a portion of a core airflow is diverted from the core flowpath into the bypass flowpath as bleed airflow.

Additionally or alternatively, in this or other embodiments the core casing includes a track positioned at the case inner surface. The slider is received in and is configured to travel along the track.

Additionally or alternatively, in this or other embodiments the track is formed integral to the core casing.

Additionally or alternatively, in this or other embodiments the track is secured to the core casing via one or more fasteners.

Additionally or alternatively, in this or other embodiments a friction-reducing coating is applied to one or more of the track and the slider.

Additionally or alternatively, in this or other embodiments the slider is configured to seal against the case inner surface when the slide is in the closed position.

Additionally or alternatively, in this or other embodiments the core case includes two or more bleed openings, and the slider circumferentially spans the two or more bleed openings to control a flow of core airflow therethrough.

Additionally or alternatively, in this or other embodiments the slider includes a plurality of slider openings. Each slider opening of the plurality of slider openings aligns with a corresponding bleed opening of the plurality of bleed openings when the slider is in the open position.

Additionally or alternatively, in this or other embodiments a circumferential included angle of the slider between a first circumferential end and a second circumferential end of the slider is 270 degrees or more.

Additionally or alternatively, in this or other embodiments an actuator is operably connected to the slider to drive movement of the slider along the track.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
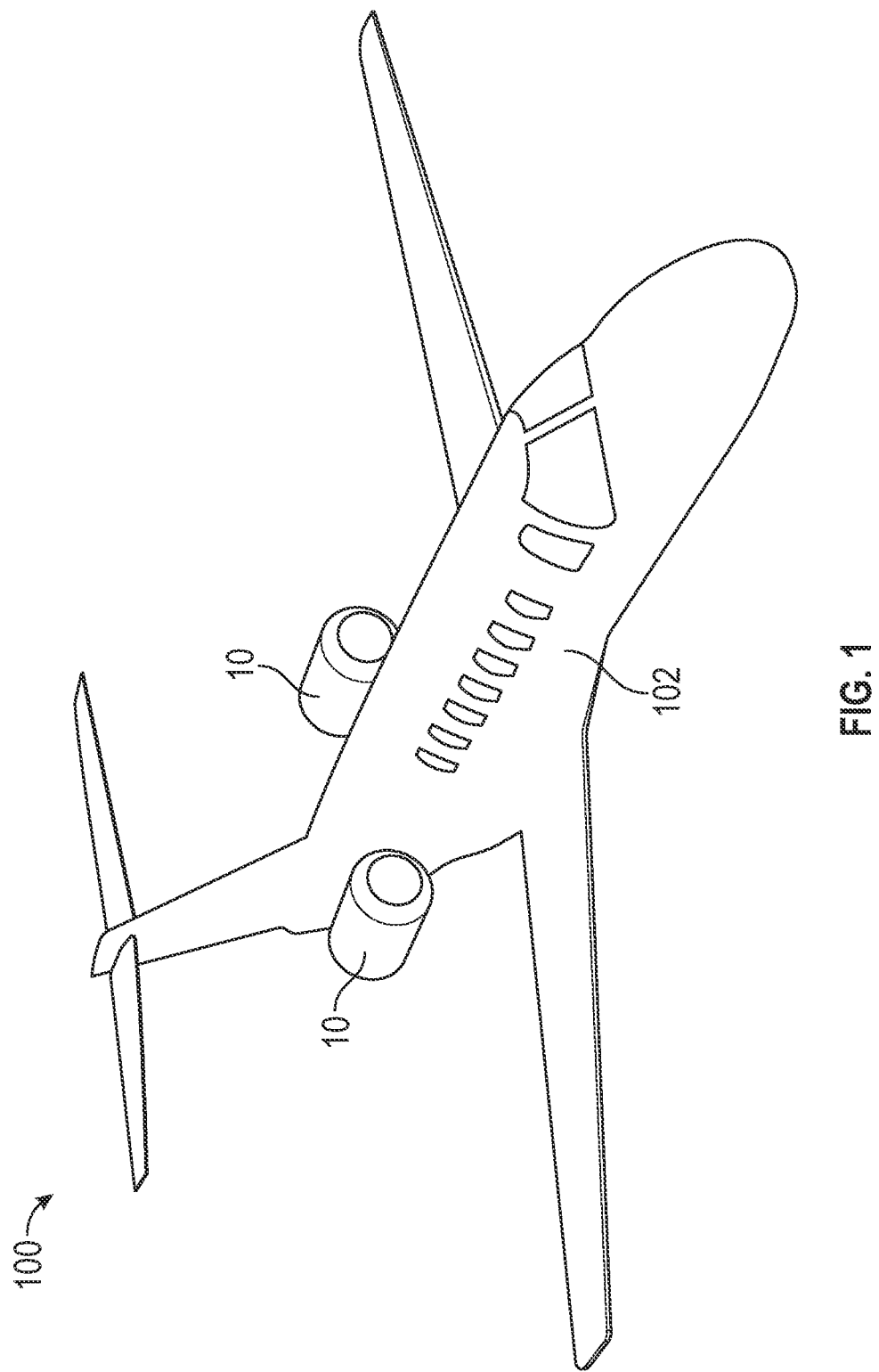
FIG. 1 is a schematic illustration of an embodiment of an aircraft.

FIG. 1 schematically illustrates an embodiment of an aircraft 100. The aircraft 100 includes an airframe 102 and one or more gas turbine engines 10 mounted on the airframe 102 to provide propulsion and/or electrical power generation for the aircraft 100.

Figure 2:
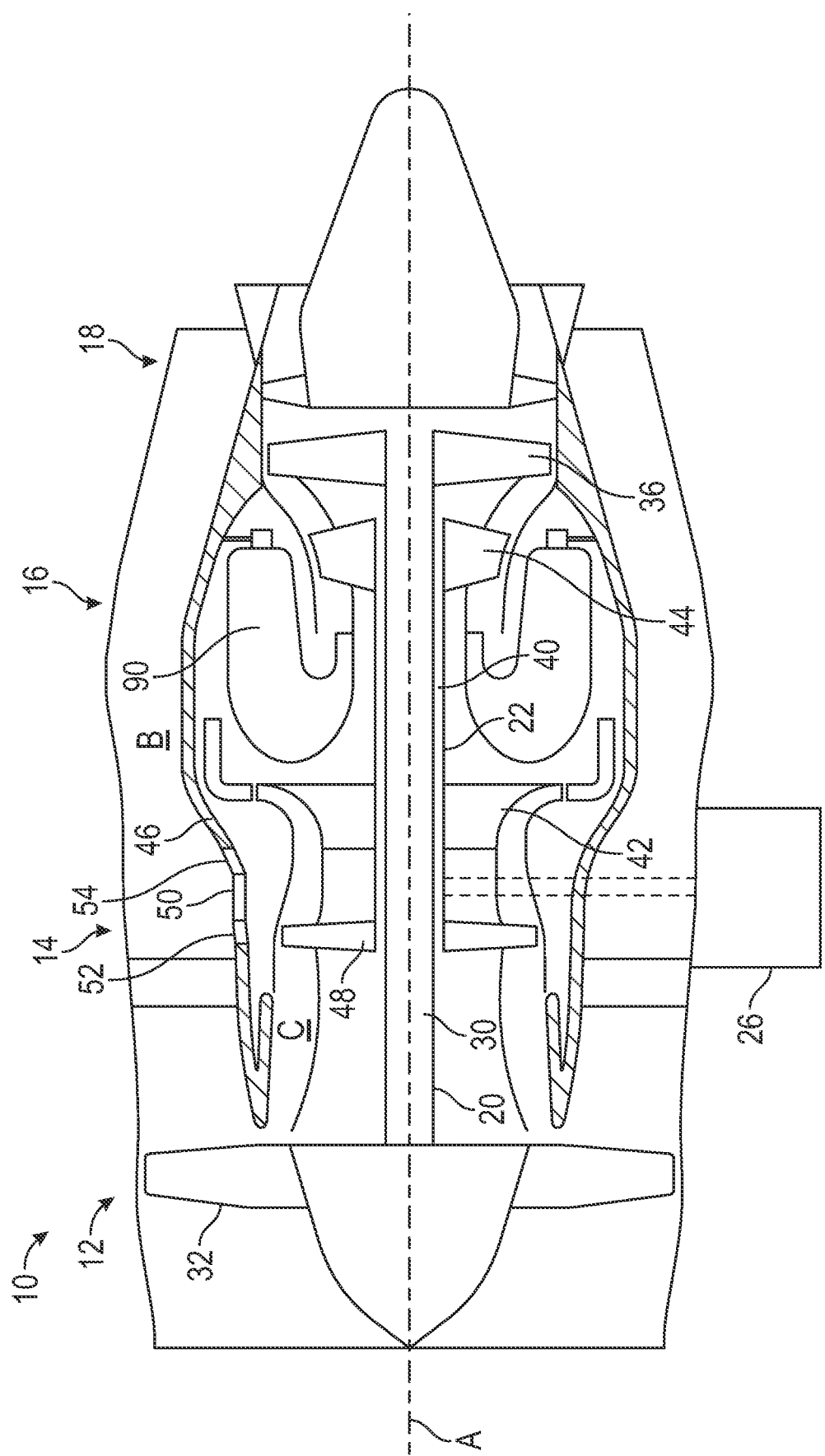
FIG. 2 is a partial cross-sectional view of an embodiment of a gas turbine engine.

An exemplary embodiment of a gas turbine engine 10 for the aircraft 100 is illustrated in FIG. 2. The gas turbine engine 10 is disclosed herein as a two-spool turbofan that generally incorporates a fan section 12, a compressor section 14, a combustor section 16 and a turbine section 18. Alternative engines might include other systems or features. The fan section 12 drives air along a bypass flow path B in a bypass duct, while the compressor section 14 drives air along a core flow path C for compression and communication into the combustor section 16 then expansion through the turbine section 18. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 10 generally includes a low speed spool 20 and a high speed spool 22 mounted for rotation about an engine central longitudinal axis A relative to an engine static structure 26.

The low speed spool 20 generally includes an inner shaft 30 that interconnects a fan 32, and a low pressure turbine 36. The high speed spool 22 includes an outer shaft 40 that interconnects an impeller 42 and high pressure turbine 44. A combustor 90 is arranged in exemplary gas turbine 10 between the impeller 42 and the high pressure turbine 44. The inner shaft 30 and the outer shaft 40 are concentric and rotate about the engine central longitudinal axis A which is collinear with their longitudinal axes.

The core airflow is compressed by the impeller 42, mixed and burned with fuel in the combustor 90, then expanded over the high pressure turbine 44 and low pressure turbine 36. The turbines 36, 44 rotationally drive the respective low speed spool 20 and high speed spool 22 in response to the expansion. It will be appreciated that each of the positions of the fan section 12, compressor section 14, combustor section 16, and turbine section 18, may be varied. While the structure described herein is a two-spool gas turbine engine 10, one skilled in the art will readily appreciate that the present disclosure may be similarly applied to a single spool or three or more spool gas turbine engine 10. The core flow path C is separated from the bypass flowpath B by a core casing 46 that encloses the compressor section 14, the combustor section 16 and the turbine section 18. The compressor section 14 includes two or more compressor stages, with each compressor stage including at least a compressor rotor 48. In some embodiments, one or more of the compressor rotors 48 is an impeller.

A bleed-off valve (BOV) 50 is disposed in the core casing 46. The BOV 50 is disposed at a bleed opening 52 that extends through an outer casing wall 54 of the core casing 46 so that when the BOV is moved into an opened position, at least a portion of airflow from the core flowpath C is vented from the core flowpath C and into the bypass flowpath B via the bleed opening 52.

Figure 3:
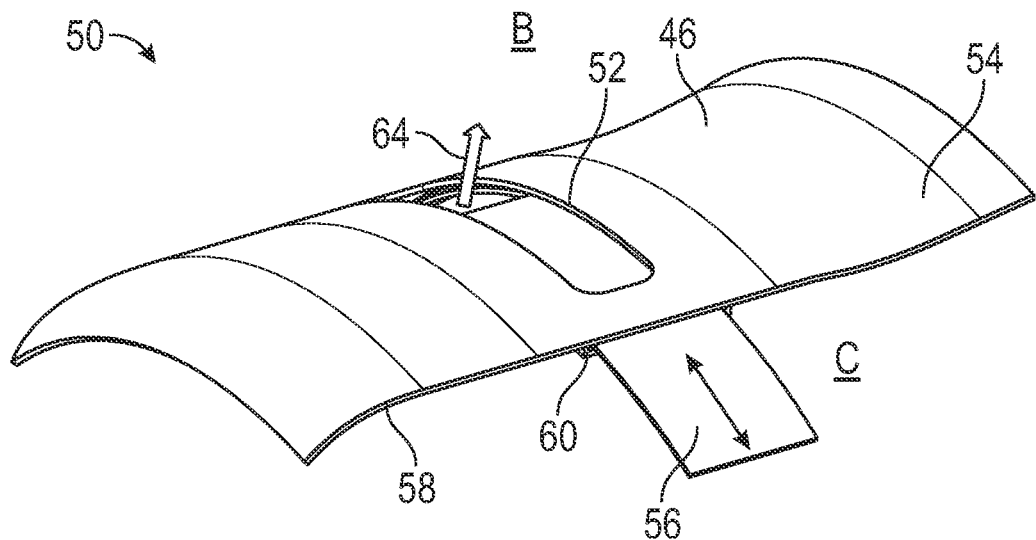
FIG. 3 is perspective view of an embodiment of a bleed arrangement of a gas turbine engine.

An embodiment of a BOV 50 is illustrated in FIG. 3. The BOV 50 includes a slider 56 that is disposed at an inner casing wall 58 of the core casing 46, which is opposite the outer casing wall 54. The slider 56 is mounted on a track 60 and is configured to move circumferentially in the track 60, relative to the engine central longitudinal axis A. When the BOV 50 is in a closed position, the slider 56 covers the bleed opening 52, while when the BOV 50 is in an open position, the slider 56 is moved circumferentially such that the bleed opening 52 is at least partially uncovered thereby allowing a bleed airflow 64 to exit the core flowpath C through the bleed opening 52 and enter the bypass flowpath B.

Figure 4:
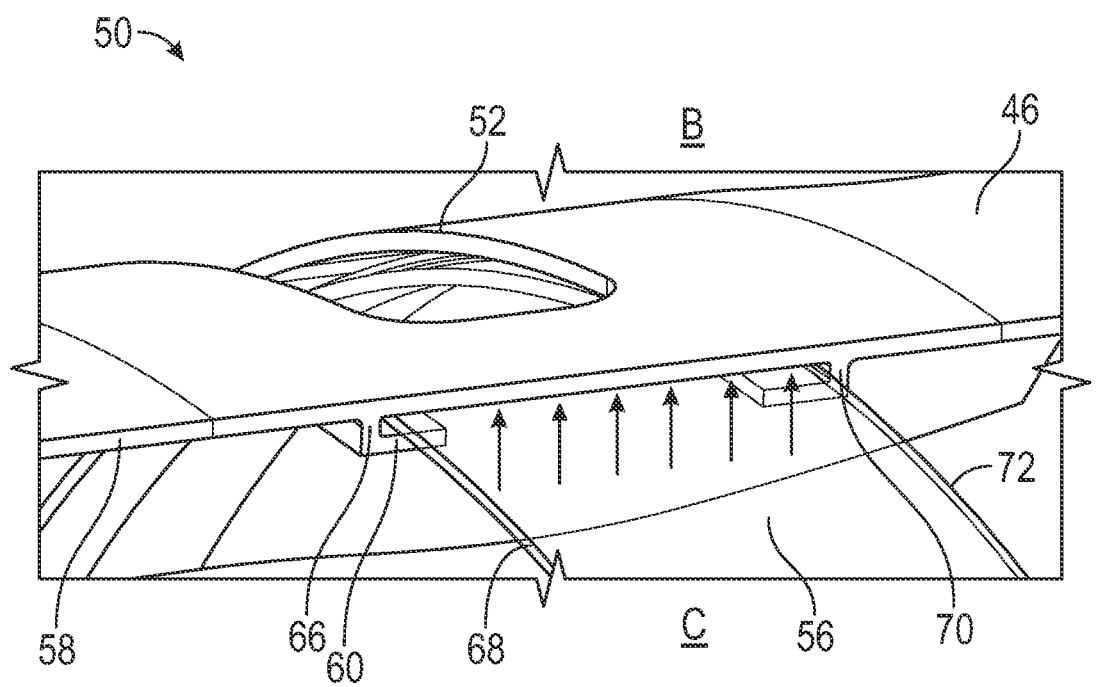
FIG. 4 is a cross-sectional view of an exemplary embodiment of a track configuration for a bleed arrangement.

Referring now to FIG. 4, in some embodiments the track 60 is formed on the inner casing wall 58. The track 60 may include a first track element 66, which is substantially L-shaped and is configured to receive a first axial side 68 of the slider 56 and an opposing L-shaped second track element 70 configured to receive a second axial side 72 of the slider 56. Additionally, the BOV 50 is configured to be self-scaling. The fluid pressure of the core flowpath C is greater than the fluid pressure of the bypass flowpath B during operation of the gas turbine engine 10. As a result of this differential in pressure during operation of the gas turbine engine 10, when the slider 56 is in the closed position, the slider 56 is urged radially outwardly in the track 60 and is pushed against the inner casing wall 58. This acts to seal the bleed opening 50 preventing leakage therethrough.

Figure 5:
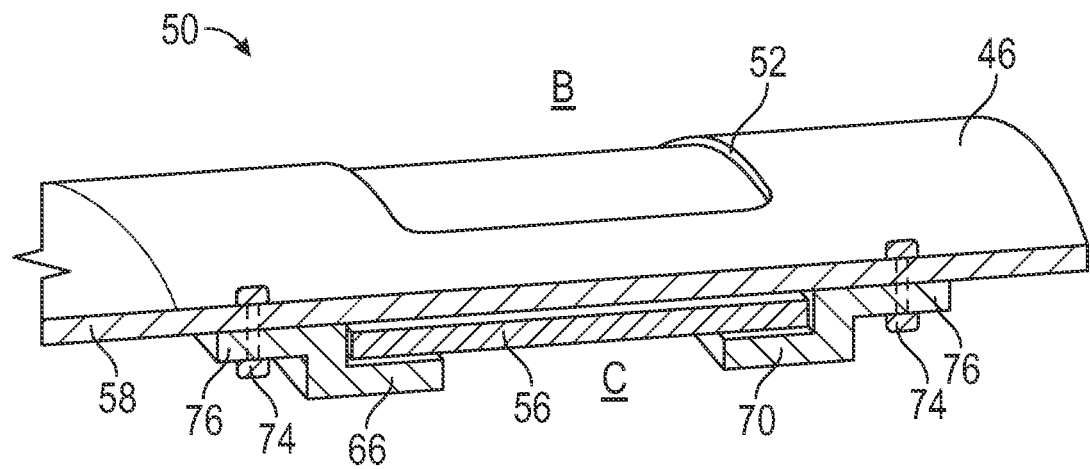
FIG. 5 is a cross-sectional view of another exemplary embodiment of a track configuration for a bleed arrangement.
Figure 6:
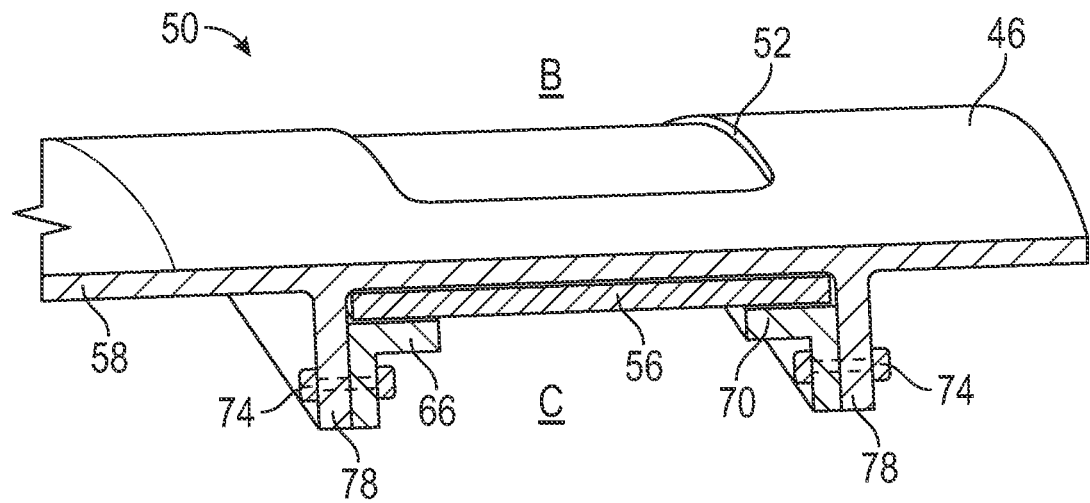
FIG. 6 is a cross-sectional view of still another exemplary embodiment of a track configuration for a bleed arrangement.
Figure 7:
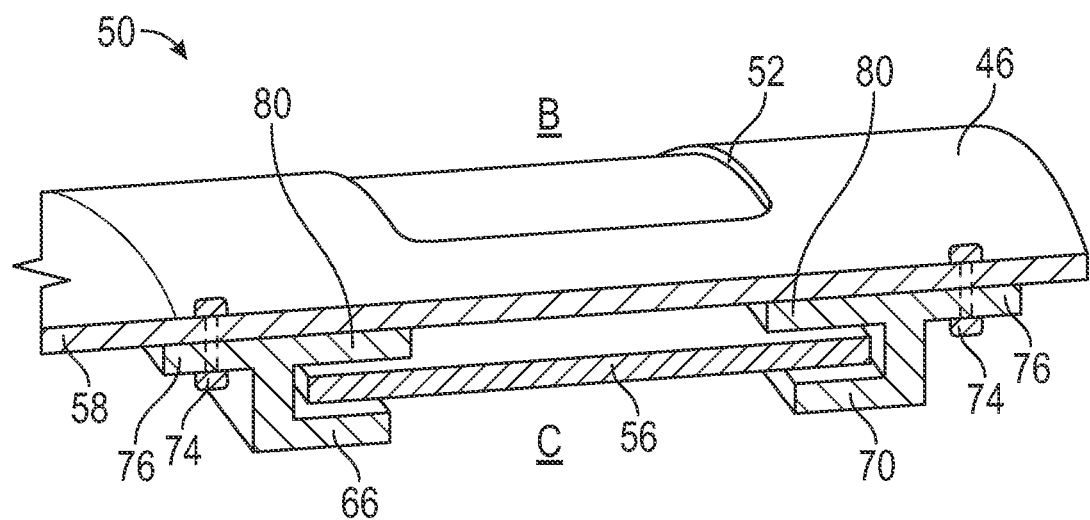
FIG. 7 is a cross-sectional view of yet another exemplary embodiment of a track configuration for a bleed arrangement.

While in the embodiment of FIG. 4, the track 60 is formed directly on the inner casing wall 58, in other embodiments such as in FIGS. 5-7, the track 60 may have other configurations. In the embodiment of FIG. 5, the L-shaped track elements 66 and 70 are not formed directly on the inner casing wall 58, but are formed separately and installed to the inner casing wall 58 via one or more fasteners 74, such as bolts, screws, rivets, and/or adhesives. In this embodiment, the track elements 66, 70 may include an additional fastening arm 76 which is located against the inner casing wall 58, and through which the fasteners 74 extend. In another embodiment, illustrated in FIG. 6, casing ribs 78 extend radially inwardly from the casing inner wall 54, and are in some embodiments formed integral to the inner casing wall 58. The track elements 66 and 70 are each secured to a casing rib 78 by fasteners 74 extending through the track elements 66 and 70 and at least partially through the casing rib 78. In another embodiment, shown in FIG. 7, the track elements 66, 70 are C-shaped such that the sealing surface of the slider 56 is not the inner casing wall 58, but is a sealing arm 80 of the track elements 66, 70. The track elements 66, 70 further may include fastening arms 76 through which the fasteners 74 extend into the core casing 46 to secure the track elements 66, 70 thereto. In some embodiments, the track elements 66, 70 may be formed from a low-friction composite material to reduce friction during operation of the slider 56 and or to improve sealing performance of the slider 56 to the sealing arm 80. The track elements 66, 70 may be formed from, for example, milling, 3D printing or other additive manufacturing processes, or electrical discharge machining (EDM). Further, coatings may be utilized on the track elements 66, 70 and/or on the slider 56 to reduce friction or improve sealing performance. Additionally, in some embodiments, the slider 56 may be manufactured to be somewhat flexible to improve sealing performance. In one embodiment, the slider is formed from stainless steel sheet metal. One skilled in the art will readily appreciate that the embodiments shown in FIGS. 3-7 are merely exemplary and that other configuration of track 60 may be utilized.

Figure 8:
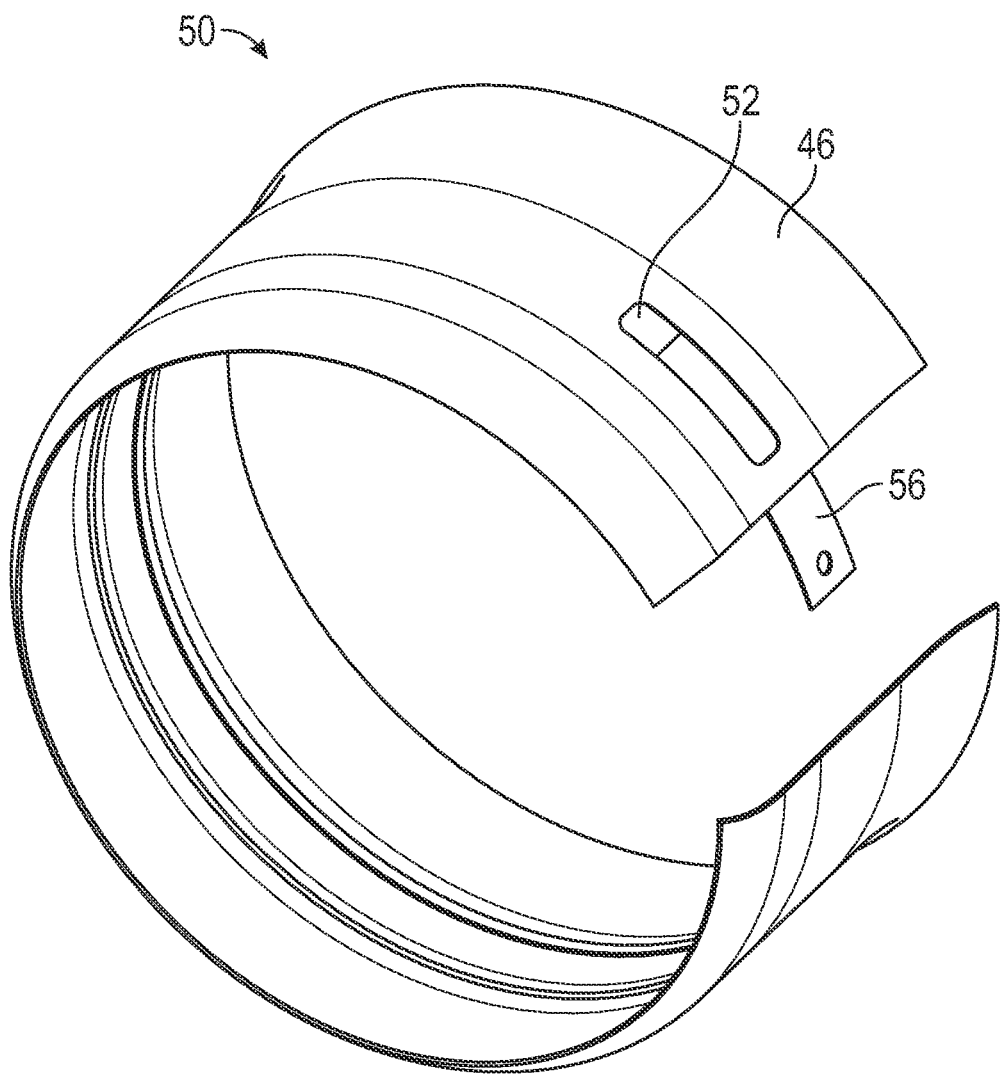
FIG. 8 is a partial perspective view of an embodiment of a slider configuration.
Figure 9:
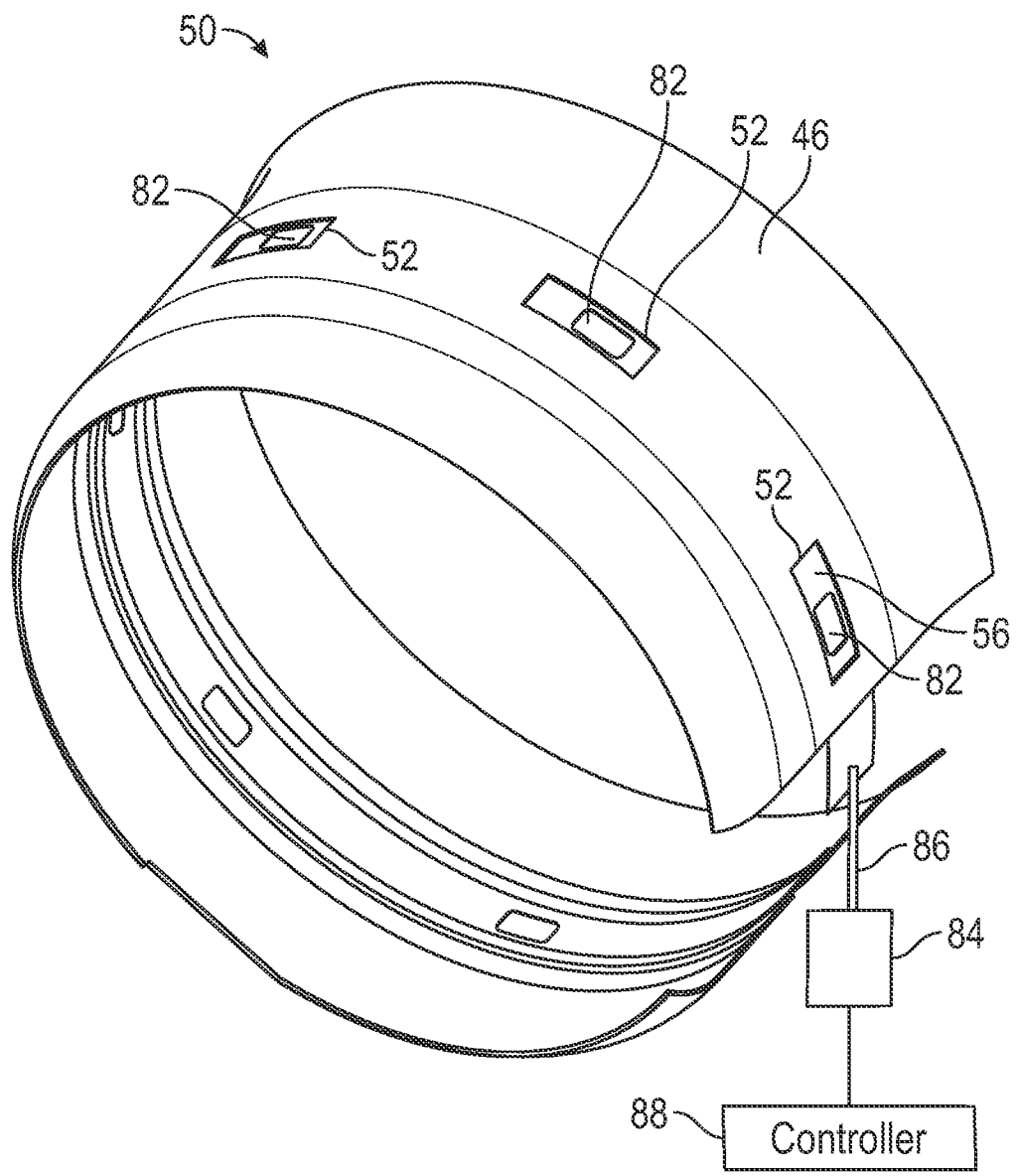
FIG. 9 is a partial perspective view of another embodiment of a slider configuration.

Referring now to FIG. 8, in some embodiments the slider 56 may be configured to extend only partially around a circumference of the core casing 46, having an included angle of about 45 degrees or less between circumferential ends of the slider 56, such as shown in FIG. 8. In such embodiments, there may be only one bleed opening 52, with the slider 56 operated to control bleed airflow 64 through the bleed opening 52. In other embodiments, such as shown in FIG. 9, the slider 56 may extend around a greater portion of the circumference of the core casing 46, having an included angle between circumferential ends of the slider 56 of 270 degrees or more. In such embodiments, the core casing 46 may have multiple bleed openings 52 arrayed circumferentially about the core case 46, all axially aligned with the slider 56. The slider 56 has multiple slider openings 82, each slider opening 82 corresponding to a bleed opening 52. With this configuration, circumferential movement of the slider 56 controls bleed airflow 64 through the plurality of bleed openings 52. Depending on desired bleed airflow performance, the bleed openings 52 may all be identical in shape and size, or may vary in shape and/or cross-sectional area depending on circumferential position of the bleed opening 52. Similarly, in some embodiments the slider openings 82 are identical in size and/or shape, while in other embodiments the shape and/or cross-sectional area of the slider openings 82 varies depending on circumferential location of the slider opening 82.

Figure 10:
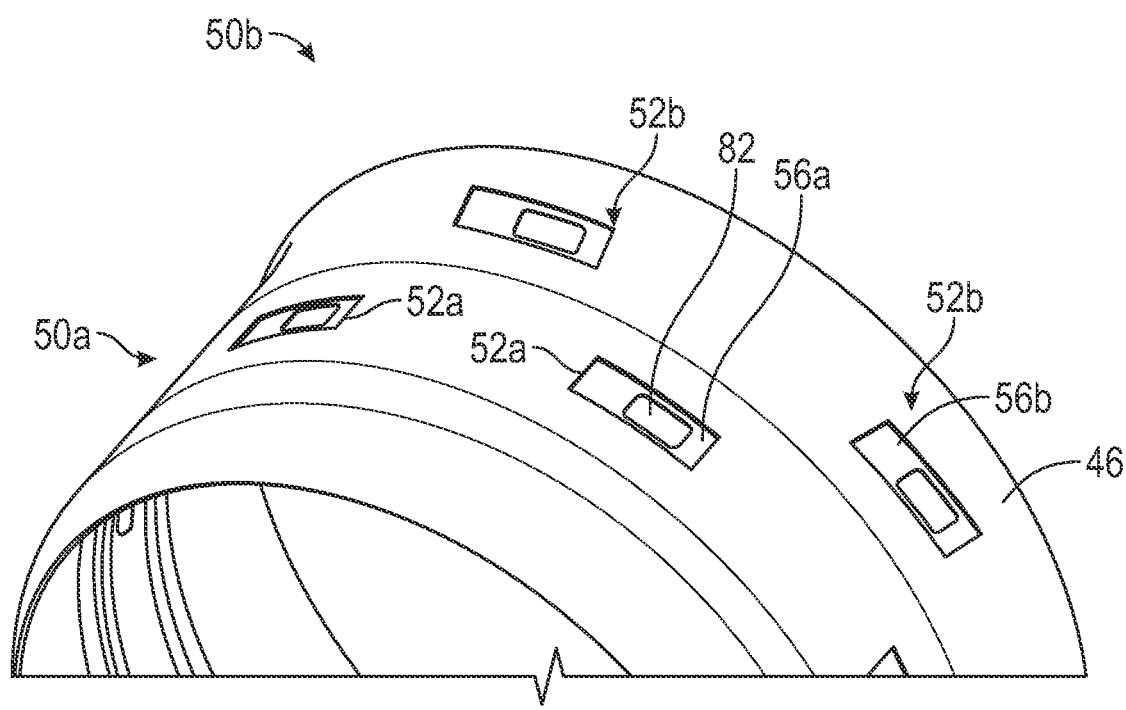
FIG. 10 is a partial perspective view of still another embodiment of a slider configuration.

Referring now to FIG. 10, in some embodiments, two or more BOV 50 arrangements may be utilized with a first BOV 50a at a first axial location and a second BOV 50b at a second axial location. While in some embodiments the first bleed openings 52a of the first BOV 50a are circumferentially aligned with the second bleed openings 52b of the second BOV 50b, in other embodiments as illustrated in FIG. 10 the first bleed openings 52a may be circumferentially offset from the second bleed openings 52b. In some embodiments, two or more sliders 56 are utilized with a first slider 56a operating in the first BOV 50a and a second slider 56b operating in the second BOV 50b, with the first slider 56a and the second slider 56b being independently operable. In other embodiments, the two BOVs 50a and 50b are operated via a common slider 56, with second bleed openings 52b axially offset from the first bleed openings 52a.

Referring again to FIG. 9, to control and drive movement and position of the slider 56 thus controlling the bleed airflow 64, the slider 56 is operable connected to an actuator 84, which is configured to drive the slider 56 circumferentially along the track 60. In some embodiments the actuator 84 is connected to the slider 56 via a linkage arm 86 at or near a circumferential end of the slider 56. The operation of the actuator 84 is controlled by an engine controller 88, which in some embodiments is a full authority digital engine control (FADEC). One skilled in the art will readily appreciate that this configuration is merely exemplary and that other configurations may be utilized. In the embodiments of FIG. 10, the first slider 56a and the second slider 56b may be operated by a common actuator 84 connected to each of the sliders 56a and 56b, or alternatively may be operated by separate, independent actuators 84.

The BOC 50 disclosed herein includes relatively few moving parts, is self-sealing, and is a cost effective solution to improve bleed performance of the gas turbine engine 10.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bleed arrangement of a gas turbine engine of an aircraft, comprising:
   a core casing having one or more bleed openings defined in a case radially outer surface, the case radially outer surface separating a core flowpath from a bypass flowpath of the gas turbine engine; and
   a slider disposed radially inboard of a case radially inner surface opposite the case radially outer surface of the core casing relative to an engine central longitudinal axis, the slider configured to be moved circumferentially between a closed position blocking the one or more bleed openings and an open position in which at least a portion of a core airflow is diverted from the core flowpath into the bypass flowpath as bleed airflow.

2. The bleed arrangement of claim 1, wherein the core casing includes a track disposed at the case radially inner surface, the slider received in and configured to travel along the track.

3. The bleed arrangement of claim 2, wherein the track is formed integral to the core casing.

4. The bleed arrangement of claim 2, wherein the track is secured to the core casing via one or more fasteners.

5. The bleed arrangement of claim 2, further comprising a friction-reducing coating applied to one or more of the track and the slider.

6. The bleed arrangement of claim 1, wherein the slider is configured to seal against the case radially inner surface when the slide is in the closed position.

7. The bleed arrangement of claim 1, wherein:
the core case includes two or more bleed openings; and
the slider circumferentially spans the two or more bleed openings to control a flow of core airflow therethrough.

8. The bleed arrangement of claim 7, wherein the slider includes a plurality of slider openings, each slider opening of the plurality of slider openings aligning with a corresponding bleed opening of the plurality of bleed openings when the slider is in the open position.

9. The bleed arrangement of claim 7, wherein a circumferential included angle of the slider between a first circumferential end and a second circumferential end of the slider is 270 degrees or more.

10. The bleed arrangement of claim 1, further comprising an actuator operably connected to the slider to drive movement of the slider along the track.

11. A gas turbine engine of an aircraft, comprising:
a compressor section to compress a core airflow;
a combustor section configured to combust a mixture of fuel and compressed core airflow;
a turbine section driven by products of the combustion, the turbine section operably connected to the compressor to drive operation of the compressor;
a core casing separating a core flowpath from a bypass flowpath and enclosing the compressor section, the combustor section and the turbine section; and
a bleed arrangement including:
one or more bleed openings in a case radially outer surface of the core casing at the compressor section; and
a slider disposed radially inboard of a case radially inner surface of the core casing opposite the case radially outer surface relative to an engine central longitudinal axis, the slider configured to be moved circumferentially between a closed position blocking the one or more bleed openings and an open position in which at least a portion of a core airflow is diverted from the core flowpath into the bypass flowpath as bleed airflow.

12. The gas turbine engine of claim 11, wherein the core casing includes a track disposed at the case radially inner surface, the slider received in and configured to travel along the track.

13. The gas turbine engine of claim 12, wherein the track is formed integral to the core casing.

14. The gas turbine engine of claim 12, wherein the track is secured to the core casing via one or more fasteners.

15. The gas turbine engine of claim 12, further comprising a friction-reducing coating applied to one or more of the track and the slider.

16. The gas turbine engine of claim 11, wherein the slider is configured to seal against the case radially inner surface when the slide is in the closed position.

17. The gas turbine engine of claim 11, wherein:
the core case includes two or more bleed openings; and
the slider circumferentially spans the two or more bleed openings to control a flow of core airflow therethrough.

18. The gas turbine engine of claim 17, wherein the slider includes a plurality of slider openings, each slider opening of the plurality of slider openings aligning with a corresponding bleed opening of the plurality of bleed openings when the slider is in the open position.

19. The gas turbine engine of claim 17, wherein a circumferential included angle of the slider between a first circumferential end and a second circumferential end of the slider is 270 degrees or more.

20. The gas turbine engine of claim 11, further comprising an actuator operably connected to the slider to drive movement of the slider along the track.

* * * * *